United States Patent
Ma et al.

(10) Patent No.: US 7,255,726 B2
(45) Date of Patent: Aug. 14, 2007

(54) COMPOSITE GAS SEPARATION MODULES HAVING HIGH TAMMAN TEMPERATURE INTERMEDIATE LAYERS

(75) Inventors: Yi Hua Ma, Worcester, MA (US); Ivan P. Mardilovich, Worcester, MA (US); Erik E. Engwall, Worcester, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 231 days.

(21) Appl. No.: 10/836,088

(22) Filed: Apr. 30, 2004

(65) Prior Publication Data

US 2004/0244590 A1    Dec. 9, 2004

Related U.S. Application Data

(60) Provisional application No. 60/467,493, filed on May 2, 2003.

(51) Int. Cl.
*B01D 53/22* (2006.01)
*B01D 67/00* (2006.01)
*B01D 71/02* (2006.01)
*C01B 3/50* (2006.01)

(52) U.S. Cl. ............ 95/56; 96/11; 55/DIG. 5; 427/245; 427/190; 427/203; 427/205; 428/670

(58) Field of Classification Search ............ 95/43, 95/45, 55, 56; 55/DIG. 5; 96/4, 11; 427/245, 427/250, 405, 190, 191, 203, 205; 428/548, 428/670
See application file for complete search history.

(56) References Cited

U.S. PATENT DOCUMENTS

| | | |
|---|---|---|
| 2,958,391 A | 11/1960 | deRosset |
| 3,241,298 A | 3/1966 | Pierce |
| 3,413,777 A | 12/1968 | Langley et al. |
| 3,428,476 A | 2/1969 | Langley et al. |

(Continued)

FOREIGN PATENT DOCUMENTS

EP    1208904 A1    5/2002

(Continued)

OTHER PUBLICATIONS

Gryaznov, V. M., "Metal Containing Membranes for the Production of Ultrapure Hydrogen and the Recovery of Hydrogen Isotopes," *Separation and Purification Methods* (now *Separation and Purification Reviews*), 29(2):171-187 (2000).

(Continued)

*Primary Examiner*—Frank M. Lawrence
(74) *Attorney, Agent, or Firm*—Hamilton, Brook, Smith & Reynolds, PC (57) ABSTRACT

A composite gas separation module includes a porous metal substrate; an intermediate layer that includes a powder having a Tamman temperature higher than the Tamman temperature of the porous metal substrate and wherein the intermediate layer overlies the porous metal substrate; and a dense hydrogen-selective membrane, wherein the dense hydrogen-selective membrane overlies the intermediate layer. In another embodiment, a composite gas separation module includes a porous metal substrate; an intermediate powder layer; and a dense gas-selective membrane, wherein the dense gas-selective membrane overlies the intermediate powder layer.

43 Claims, 1 Drawing Sheet

U.S. PATENT DOCUMENTS

| | | | |
|---|---|---|---|
| 3,717,525 | A | 2/1973 | Bültemann |
| 4,496,373 | A | 1/1985 | Behr et al. |
| 4,589,891 | A | 5/1986 | Iniotakis et al. |
| 4,699,637 | A | 10/1987 | Iniotakis et al. |
| 4,857,080 | A | 8/1989 | Baker et al. |
| 5,049,167 | A | 9/1991 | Castro et al. |
| 5,139,541 | A | 8/1992 | Edlund |
| 5,205,841 | A | 4/1993 | Vaiman |
| 5,215,729 | A | 6/1993 | Buxbaum |
| 5,217,506 | A | 6/1993 | Edlund et al. |
| 5,259,870 | A | 11/1993 | Edlund |
| 5,358,553 | A | 10/1994 | Najjar et al. |
| 5,393,325 | A | 2/1995 | Edlund |
| 5,449,848 | A | 9/1995 | Itoh |
| 5,451,386 | A | 9/1995 | Collins et al. |
| 5,498,278 | A | 3/1996 | Edlund |
| 5,614,001 | A | 3/1997 | Kosaka et al. |
| 5,652,020 | A | 7/1997 | Collins et al. |
| 5,672,388 | A | 9/1997 | McHenry et al. |
| 5,738,708 | A | 4/1998 | Peachey et al. |
| 5,782,959 | A * | 7/1998 | Yang et al. ............ 96/11 |
| 5,782,960 | A | 7/1998 | Ogawa et al. |
| 5,895,769 | A | 4/1999 | Lai |
| 5,904,754 | A | 5/1999 | Juda et al. |
| 6,152,987 | A | 11/2000 | Ma et al. |
| 6,152,995 | A | 11/2000 | Edlund |
| 6,183,542 | B1 | 2/2001 | Bossard |
| 6,267,801 | B1 | 7/2001 | Baake et al. |
| 6,309,546 | B1 * | 10/2001 | Herrmann et al. ..... 210/500.25 |
| 6,372,363 | B1 | 4/2002 | Krueger |
| 6,379,524 | B1 | 4/2002 | Lee et al. |
| 6,419,728 | B1 | 7/2002 | Edlund |
| 6,452,276 | B1 | 9/2002 | Cohen et al. |
| 6,475,268 | B2 | 11/2002 | Thornton |
| 6,547,858 | B1 | 4/2003 | Edlund et al. |
| 6,596,057 | B2 | 7/2003 | Edlund et al. |
| 6,730,145 | B1 | 5/2004 | Li |
| 6,916,454 | B2 * | 7/2005 | Alvin ................. 422/211 |
| 6,964,697 | B2 * | 11/2005 | Pan et al. ................. 96/10 |
| 7,018,446 | B2 * | 3/2006 | Alvin et al. ............... 95/56 |
| 7,125,440 | B2 * | 10/2006 | Bossard et al. ............ 96/10 |
| 2002/0081845 | A1 | 6/2002 | Lee et al. |
| 2002/0083829 | A1 | 7/2002 | Edlund et al. |
| 2002/0175418 | A1 | 11/2002 | Cohen et al. |
| 2003/0183080 | A1 | 10/2003 | Mundschau |
| 2003/0190486 | A1 | 10/2003 | Roa et al. |
| 2003/0213365 | A1 * | 11/2003 | Jantsch et al. ............. 96/11 |
| 2004/0037962 | A1 | 2/2004 | Uemura et al. |
| 2004/0244589 | A1 | 12/2004 | Bossard et al. |
| 2005/0072304 | A1 * | 4/2005 | Etievant et al. ............ 96/11 |
| 2006/0188737 | A1 | 8/2006 | Roa et al. |

FOREIGN PATENT DOCUMENTS

| | | | |
|---|---|---|---|
| EP | 1277512 A1 | | 1/2003 |
| JP | 05-123548 | | 5/1993 |
| JP | 10-028850 A | * | 2/1998 |
| WO | WO99/33545 | * | 7/1999 |
| WO | WO 03/011433 A1 | | 2/2003 |
| WO | WO 2005/075060 A1 | | 8/2005 |

OTHER PUBLICATIONS

Gryaznov, V. M., et al., "Preparation and catalysis over Palladium Composite Membranes," *Applied Catalysis A: General*, 96:15-23 (1993).

Ma, Y. H., et al., "Characterization of Intermetallic Diffusion Barrier and Alloy Formation for Pd/Cu and Pd/Ag Porous Stainless Steel Composite Membranes," *I & EC Research*, 43:2936-2945 (2004).

Ma, Y. H., et al., "Thin Composite Palladium and Palladium/Alloy Membranes for Hydrogen Separation," *Ann. N.Y. Acad. Sci.*, 984:346 (2003).

Mardilovich, I. P., et al., "Dependence of Hydrogen Flux on The Pore Size and Plating Surface Topology of Asymmetric Pd-Porous Stainless Steel Membranes," *Desalination*, 144:85-89 (2002).

Nam, S.-E., et al., "Hydrogen Separation by Pd Alloy Composite Membranes," *J. Membrane Sci.*, 192:177-185 (2001).

Ozaki, T., et al., "Preparation of Palladium-coated V and V-15 Ni Membranes for Hydrogen Purification by Electroless Plating Technique," *Int. J. Hydrogen Energy*, 28:297 (2003).

Roa, F., "Preparation and Characterization of Pd-Cu Composite Membranes for Hydrogen Separation," *Chem. Eng. J.*, 93:11 (2003).

Roa, F., et al., "The Influence of Alloy Composition on The $H_2$ Flux of Composite Pd-Cu Membranes," *Desalination*, 147:411-416 (2002).

Shu, J., et al., "Structurally Stable Pd-Ag Alloy Membranes: Introduction of a Diffusion Barrier," *Thin Solid Films*, 286:72-79 (1996).

U.S. Appl. No. 60/475,620, by Peter R. Bossard, filed Jun. 4, 2003.

U.S. Appl. No. 10/804,847, by Yi Hua Ma, Ivan P. Mardilovich and Erik E. Engwall, filed Mar. 19, 2004.

U.S. Appl. No. 10/804,848, by Yi Hua Ma, Ivan P. Mardilovich and Erik E. Engwall, filed Mar. 19, 2004.

U.S. Appl. No. 10/804,846, by Yi Hua Ma, Ivan P. Mardilovich and Erik E. Engwall, filed Mar. 19, 2004.

U.S. Appl. No. 10/896,743, by Yi Hua Ma and Federico Guazzone, filed Jul. 21, 2004.

* cited by examiner

COMPOSITE GAS SEPARATION MODULES HAVING HIGH TAMMAN TEMPERATURE INTERMEDIATE LAYERS

RELATED APPLICATION

This application claims the benefit of U.S. Provisional Application No. 60/467,493, filed on May 2, 2003, the entire teachings of which are incorporated herein by reference.

BACKGROUND OF THE INVENTION

Gas separation modules are commonly used to selectively separate a particular gas from a gas mixture. Two of the most common gas separation modules are polymer membranes and metallic composites. Polymer membranes can provide an effective and cost-efficient option for separating a gas at low temperatures. Where separations must be performed in conjunction with high-temperature processing, however, polymer membranes are generally unsuitable because they tend to thermally decompose.

The development of high-temperature processing, along with tighter environmental regulations, requires utilization of gas separation modules that provide high flux, high selectivity of separation, and the ability to operate at elevated temperatures. Instead of polymers, metallic composite modules can be employed to serve these needs. A composite gas separation module can consist of a metallic membrane having selective gas permeability mounted on a porous substrate.

An area of high-temperature gas separation that is of particular interest is the separation and purification of hydrogen gas from a reaction gas mixture. A composite module for selectively separating hydrogen gas at high temperatures can include a palladium (Pd) membrane. Ideally, the palladium membrane is permeable to hydrogen but not to other gases. When hydrogen gas ($H_2$) contacts the membrane, the hydrogen molecules dissociate and hydrogen atoms diffuse into the membrane. Accordingly, hydrogen can selectively pass from a surrounding atmosphere through the palladium membrane. The selectively separated hydrogen atoms then reassociate into $H_2$ gas and pass into a volume on the opposite side of the module.

The effective life of a typical composite gas separation module having a hydrogen-selective metal membrane bonded to a porous substrate often is limited by diffusion of substrate components into the membrane which decreases the hydrogen permeability of the membrane. The rate of diffusion of the substrate components is greatest when the substrate is at or above its Tamman temperature. A metal lattice at its Tamman temperature is subjected to considerable thermal (atomic) vibration. If there is an interface between two metals, such thermal vibration significantly increases the mobility of metal atoms and their consequent diffusion. The Tamman temperature of a material is equal to one-half of its melting point temperature in Kelvin. For example, in the case of a hydrogen-selective palladium membrane on a stainless steel substrate, palladium and stainless steel have melting point temperatures of 1552° C. (1825 K) and 1375-1400° C. (1648-1673 K), respectively. The corresponding Tamman temperatures are about 640° C. (913 K) and 550-560° C. (823-833 K), respectively. The lower of these Tamman temperatures determines the temperature where a significant increase in intermetallic diffusion can occur. Accordingly, at temperatures around 550° C. considerable thermal vibration and diffusion of stainless steel substrate components into a palladium membrane can be expected in such a composite gas separation module. The alloy created by the diffusion of stainless steel substrate components into a palladium membrane can have reduced hydrogen permeability.

One solution to this problem has been to use a ceramic substrate, which tends to exhibit less diffusion of substrate components into the hydrogen-selective metal membrane than a predominantly metallic substrate. However, ceramic substrates are typically more brittle than predominantly metallic substrates. Further, ceramic substrates can be more difficult to fabricate and also can be more difficult to join to other components in a gas separation system.

Gas separation modules formed purely of a hydrogen-selective metal such as palladium also have been used. Eliminating the presence of the substrate in such a gas separation module can remove the problem of intermetallic diffusion. However, such a module can be very expensive to produce and can lack the mechanical strength that can be required for high pressure and/or high temperature applications. For example, a gas separation module formed purely of a hydrogen-selective metal generally must have a much greater thickness than a composite gas separation module to provide adequate mechanical strength. This increase in thickness can reduce the gas flux that can be established through the module.

Therefore, a need exists for composite gas separation modules (and methods for their fabrication) that overcome or minimize the above-referenced problems.

SUMMARY OF THE INVENTION

The present invention relates to composite gas separation modules and to methods for fabricating a composite gas separation module. The present invention also relates to methods for selectively separating hydrogen gas from a hydrogen gas-containing gaseous stream.

In one embodiment, the composite gas separation module includes a porous metal substrate; an intermediate layer that includes a powder having a Tamman temperature higher than the Tamman temperature of the porous metal substrate and wherein the intermediate layer overlies the porous metal substrate; and a dense hydrogen-selective membrane, wherein the dense hydrogen-selective membrane overlies the intermediate layer. Powder of the intermediate layer is typically substantially or completely unsintered. For example, the powder having a Tamman temperature higher than the Tamman temperature of the porous metal substrate is substantially or completely unsintered.

In another embodiment, the present invention includes a composite gas separation module having a porous metal substrate; an intermediate powder layer; and a dense gas-selective membrane, wherein the dense gas-selective membrane overlies the intermediate powder layer. The intermediate powder layer includes a powder that is typically substantially or completely unsintered.

A method for fabricating a composite gas separation module includes applying an intermediate layer that includes a powder having a Tamman temperature higher than the Tamman temperature of the porous metal substrate over a porous metal substrate; and applying a dense hydrogen-selective membrane over the intermediate layer, thereby forming the composite gas-separation module. The present invention also relates to a composite gas separation module formed by this method.

The intermediate layer can include a powder having a Tamman temperature higher than the Tamman temperature of the dense hydrogen-selective membrane. For example, in one embodiment, the intermediate layer includes a powder having a Tamman temperature higher than both the Tamman temperature of the porous metal substrate and the Tamman temperature of the dense hydrogen-selective membrane.

In one aspect of the present invention, the intermediate layer can include at least one metal that enhances the gas permeability of the dense gas-selective membrane upon intermetallic diffusion of the metal into the membrane. For example, the intermediate layer can further include at least one material having a Tamman temperature that permits intermetallic diffusion of that material into the membrane. In one embodiment, the intermediate layer can include at least one material having a Tamman temperature less than or about equal to the Tamman temperature of the dense hydrogen-selective membrane. In some embodiments, the dense hydrogen-selective membrane includes palladium or an alloy thereof.

In one embodiment of the invention, a method for selectively separating hydrogen gas from a hydrogen gas-containing gaseous stream includes the step of directing the hydrogen gas-containing gaseous stream to a composite gas separation module, wherein the composite gas separation module includes a porous metal substrate; an intermediate layer that includes a powder having a Tamman temperature higher than the Tamman temperature of the porous metal substrate and wherein the intermediate layer overlies the porous metal substrate; and a dense hydrogen-selective membrane, wherein the dense hydrogen-selective membrane overlies the intermediate layer. By this method, hydrogen gas is at least partially partitioned from the gaseous stream by passing through the dense hydrogen-selective membrane.

The performance of composite gas separation modules can be limited by the thickness of the constituent dense hydrogen-selective membrane; the number and size of defects in the membrane (e.g., pores, holes, cracks or other physical conditions that impair the gas-selectivity of the composite gas separation module by allowing the passage of an undesired gas); and the composition of the membrane. To obtain efficient separation, a dense hydrogen-selective membrane should not be breached by regions or points which do not produce the desired gas selectivity by allowing the passage of an undesired gas. In general, at high temperatures, rates of intermetallic diffusion of metal atoms between adjacent structures of the composite gas separation module can become significant. For example, at high temperatures metal atoms of the porous metal substrate can diffuse at a significant rate into the dense hydrogen-selective membrane. A dense hydrogen-selective membrane into which substrate components have diffused can produce reduced flux of a desired gas through the membrane. For example, the diffusion of components from a porous metal substrate into a palladium or palladium alloy dense hydrogen-selective membrane can cause deterioration of hydrogen permeation flux through the membrane.

Practice of the present invention can protect against diffusion of substrate components into the dense hydrogen-selective membrane. By preventing or reducing the diffusion of substrate components into the dense hydrogen-selective membrane, the gas permeation flux through the composite gas separation module can be maintained throughout operation of the composite gas-separation module in a gas separation process. In addition, the methods described herein for preventing or reducing the diffusion of substrate components into the dense hydrogen-selective membrane are economical and relatively simple to perform.

During a gas separation operation, the composite gas separation modules described herein can avoid membrane blistering, delamination and/or cracking even when operating at high temperatures and/or for extended periods of time.

In one embodiment, the intermediate layer has a smaller pore size than the porous metal substrate. For example, in one embodiment, a graded support is formed by applying an intermediate layer, as described herein, to a porous metal substrate. Since the effective pore size of the support is made smaller, less hydrogen-selective metal can be used to form a dense hydrogen-selective membrane. Thus, a composite gas separation module having a dense hydrogen-selective membrane thinner than dense hydrogen-selective membranes of conventionally produced composite gas separation modules can be fabricated. Forming a thinner dense hydrogen-selective membrane can also simplify manufacturing by reducing the number of layers of hydrogen-selective metal that must be applied to the porous substrate to form a dense hydrogen-selective membrane. Therefore, practice of the present invention can reduce manufacturing costs, e.g., material, labor and capital costs, for fabricating composite gas separation modules as compared to conventional fabrication techniques.

Since thinner dense hydrogen-selective membranes typically produce higher rates of gas flux, composite gas separation modules fabricated as described herein can produce higher rates of gas flux, e.g., hydrogen flux. Thus, gas separation processes utilizing the composite gas separation modules described herein can achieve higher rates of gas separation than is possible using conventional composite gas separation modules employing thicker dense hydrogen-selective membranes.

DETAILED DESCRIPTION OF THE INVENTION

Figure 1:
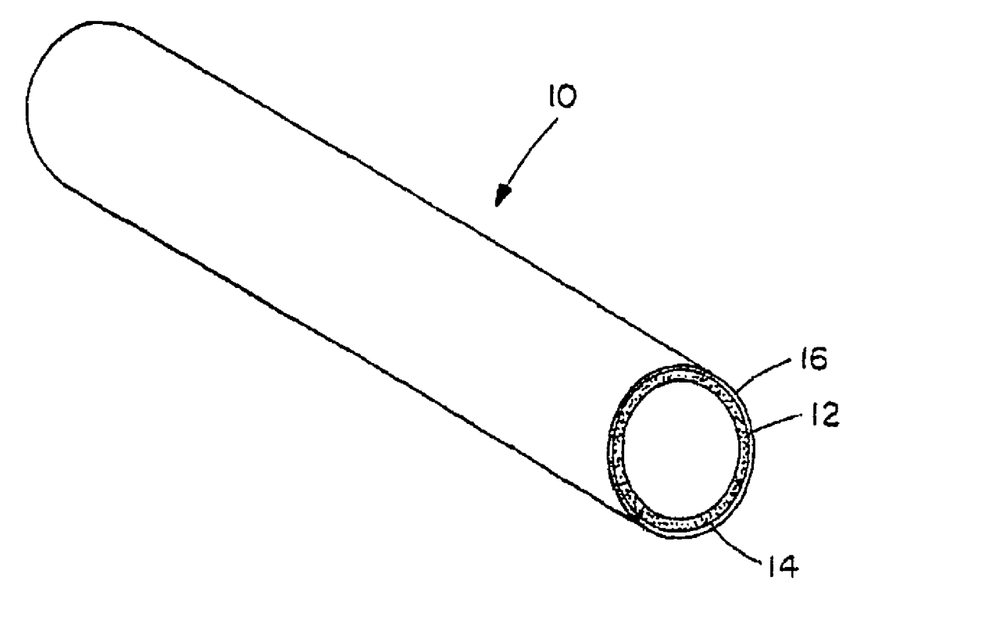
The FIGURE is a sectional perspective view of a composite gas separation module as one embodiment of the present invention.

The features and other details of the method of the invention will now be more particularly described with reference to the accompanying drawing and pointed out in the claims. It will be understood that the particular embodiments of the invention are shown by way of illustration and not as limitations of the invention. The principal features of this invention can be employed in various embodiments without departing from the scope of the invention.

The present invention relates to a composite gas separation module, comprising: (a) a porous metal substrate; (b) an intermediate layer that includes a powder having a Tamman temperature higher than the Tamman temperature of the porous metal substrate and wherein the intermediate layer overlies the porous metal substrate; and (c) a dense hydrogen-selective membrane, wherein the dense hydrogen-selective membrane overlies the intermediate layer. The composite gas separation modules described herein can prevent or reduce the diffusion of components of the porous metal substrate into the dense hydrogen-selective membrane.

The composite gas separation modules described herein include a dense gas-selective membrane such as, for example, a dense hydrogen-selective membrane. The dense hydrogen-selective membrane can include, for example, palladium or an alloy thereof. A "dense gas-selective membrane," as that term is used herein, refers to a component of a composite gas separation module that has one or more layers of a gas-selective material, i.e., a material that is selectively permeable to a gas, and that is not materially breached by regions or points which impair the separation of the gas by allowing the passage of an undesired gas. For instance, in one embodiment, the dense gas-selective membrane is not materially breached by regions or points which do not have the desired gas selectivity properties of the gas-selective material. An example of a dense gas-selective membrane is a dense hydrogen-selective membrane that is substantially free of defects such as open pores, holes, cracks and other physical conditions that impair the gas-selectivity of the composite gas separation module by allowing the passage of an undesired gas. In some embodiments, a dense gas-separation membrane can contain one or more non-metallic components, however, the dense gas-separation membranes described herein can contain at least one metallic component (e.g., a hydrogen-selective metal such as palladium or an alloy thereof).

The term "support," as used herein, includes a substrate, a surface treated substrate, a substrate upon which a material (e.g., a gas-selective material) has been deposited, a substrate with an overlying intermediate layer, or a subsequently plated substrate upon which a dense gas-selective membrane has been or will be formed. Serving as a support structure, the substrate can enhance the durability and strength of the composite gas separation module.

"Gas-selective material," as used herein, refers to those materials which, when formed into dense gas-selective membranes, allow the passage of a select gas, or select gases, through the dense gas-selective membrane. Suitable gas-selective materials include metals, ceramics (e.g., perovskite and perovskite-like materials) and zeolites (e.g., MFI and Zeolites A, X, etc.). In one embodiment, the gas-selective material is a hydrogen-selective metal such as palladium or an alloy thereof. Examples of suitable palladium alloys include palladium alloyed with at least one of the metals selected from the group consisting of copper, silver, gold, platinum, ruthenium, rhodium, yttrium, cerium and indium. For example, palladium/silver and palladium/copper alloys can be used to form dense hydrogen-selective membranes. In one embodiment, the gas-selective material is a ceramic such as oxygen gas-selective perovskite.

The side of the support upon which the dense gas-selective membrane is formed is referred to herein as the "outside" or "membrane-side" and the opposite side of the support is called the "inside" or "substrate-side" surface. However, it should be noted that the dense gas-selective membrane can be formed on the exterior surface and/or the interior surface of the substrate. For example, the dense gas-selective membrane can be formed on either or both surfaces of a planar substrate or can be formed on the exterior and/or interior surfaces of a substrate tube. Preferably, the dense gas-selective membrane is formed on only one surface of the substrate, for example, on either the exterior or the interior surface of a substrate tube.

In one embodiment, the gas-selective material can include a combination of substances, for example, a combination of a hydrogen-selective metal and a zeolite. In one embodiment, the zeolite used in a combination of substances is gas-selective. In an alternative embodiment, the zeolite used in a combination of substances is not gas-selective, for example, the zeolite used in a combination of substances is not hydrogen-selective.

Specific embodiments of the invention, including the composite gas separation modules, methods for fabricating the composite gas separation modules, and the method for selectively separating hydrogen gas from a hydrogen gas-containing gaseous stream follow. Details of optional components of the composite gas separation modules and method steps employed in various embodiments of methods for fabrication of the composite gas separation modules are described thereafter under separate subheadings.

The FIGURE illustrates cylindrical composite gas separation module 10 as one embodiment of the invention. Composite gas separation module 10 includes porous substrate 12, intermediate layer 14, and dense gas-selective membrane 16. As illustrated, intermediate layer 14 and dense gas-selective membrane 16 overlie the outside surface of cylindrical porous substrate 12. In alternative embodiments not illustrated, intermediate layer 14 and dense gas-selective membrane 16 can overlie the interior surface of cylindrical porous substrate 12 (with the dense gas-selective membrane forming the innermost of the three cylindrical layers) or can overlie both the interior and the exterior surfaces of porous substrate 12. In a preferred embodiment, intermediate layer 14 and dense gas-selective membrane 16 overlie only either the interior or the exterior surface of porous substrate 12. The composite gas separation module can take any of a variety of forms including a cylindrical tube, as illustrated in the FIGURE, or a planar surface. In one embodiment, porous metal substrate 12 also includes a layer of ceramic bonded thereto.

The composite gas separation module of the invention includes a porous metal substrate. The porous metal substrate can be formed from any of a variety of components known to those of ordinary skill in the art. Examples of suitable substrate components include, but are not limited to, iron, nickel, titanium, chromium, aluminum, and alloys thereof, e.g., steel, stainless steel, HASTELLOY® alloys (e.g., HASTELLOY® C-22®)(trademarks of Haynes International, Inc., Kokomo, Ind.) and INCONEL® alloys (e.g., INCONEL® alloy 625) (INCONEL® is a trademark of Huntington Alloys Corp., Huntington W. Va.). In one embodiment, the porous metal substrate is an alloy containing chromium and nickel (e.g., INCONEL® alloy 625). In an additional embodiment, the alloy contains chromium, nickel and molybdenum such as, for example, HASTELLOY® C-22® or INCONEL® alloy 625. The porous metal substrate can be porous stainless steel. Cylinders of porous stainless steel that are suitable for use as substrates are available from Mott Metallurgical Corporation (Farmington, Conn.) and from Pall Corporation (East Hills, N.Y.), for example.

One of ordinary skill in the art can select substrate thickness, porosity, and pore size distribution using techniques known in the art. Desired substrate thickness, porosity and pore size distribution can be selected based on, among other factors, the operating conditions of the final composite gas separation module such as operating pressure. Substrates having generally higher porosities and generally smaller pore sizes are particularly suited for producing composite gas separation modules. In some embodiments, the substrate can have a porosity in a range of about 5 to about 75% or about 15 to about 50%. While the pore size distribution of a substrate can vary, the substrate can have pore diameters that range from about 0.1 microns or less to about 15 microns or more. Generally, smaller pore sizes are preferred. However, in some embodiments, substrates having larger pores are used and a powder layer having a generally smaller pore size is formed over the substrate (e.g., a graded support is formed).

In some embodiments, the mean or median pore size of the substrate can be about 0.1 to about 15 microns, e.g., from about 0.1 to about 1, 3, 5, 7 or about 10 microns. For example, the substrate can be an about 0.1 micron grade substrate to an about 0.5 micron grade substrate, e.g., 0.1 micron, 0.2 micron, and 0.5 micron grades of stainless steel substrates can be used. In one embodiment, the substrate is 0.1 micron grade HASTELLOY® alloy.

The composite gas separation module also includes an intermediate layer, wherein the intermediate layer overlies the porous metal substrate. In one embodiment, for example, the intermediate layer has a top side and a bottom side and the intermediate layer is directly adjacent to the porous metal substrate on the bottom side and is directly adjacent to the dense hydrogen-selective membrane on the top side.

The intermediate layer can include a powder having a Tamman temperature higher than the Tamman temperature of the porous metal substrate. The intermediate layer can include a powder having a Tamman temperature higher than the Tamman temperature of the dense hydrogen-selective membrane. For example, in one embodiment, the intermediate layer includes a powder having a Tamman temperature higher than both the Tamman temperature of the porous metal substrate and the Tamman temperature of the dense hydrogen-selective membrane. Powder of the intermediate layer is typically substantially unsintered. For example, the powder having a Tamman temperature higher than the Tamman temperature of the porous metal substrate is substantially unsintered.

In another embodiment, the present invention includes a composite gas separation module having a porous metal substrate; an intermediate powder layer; and a dense gas-selective membrane, wherein the dense gas-selective membrane overlies the intermediate powder layer. The intermediate powder layer includes a powder that is typically substantially unsintered.

In some embodiments, the powder can have a melting point temperature higher than the melting point temperature of the porous metal substrate. The intermediate layer can include a powder having a melting point temperature higher than the melting point temperature of the dense hydrogen-selective membrane. For example, in one embodiment, the intermediate layer includes a powder having a melting point temperature higher than both the melting point temperature of the porous metal substrate and the melting point temperature of the dense hydrogen-selective membrane.

The powder can include metal powders, metal oxide powders, ceramic powders, zeolite powders, and combinations thereof, among others. The powder can include a blend or a layering of different powders including powders of differing compositions and/or particle sizes. For example, in one embodiment, the powder includes tungsten powder and silver powder. The powder particles can have various morphologies and shapes. For example, the powder particles can be ordered or amorphous. In one embodiment, the powder includes spherical or mostly spherical particles.

The powder of the intermediate layer can include materials such as, for example, tungsten, silver, copper oxide, aluminum oxide, zirconia, titania, silicon carbide, chromium oxide, and combinations thereof. In various embodiments, the powder can include tungsten powder, e.g., particle sizes of about 1 to about 5 microns or particle sizes less than 1 micron; silver powder, e.g., spherical particles of sizes of about 0.5 to about 1 micron or particles of sizes of about 0.6 to about 2 microns; copper oxide powder, e.g., copper (II) oxide powder particles of less than 5 microns or of about 0.01 micron; aluminum oxide ($Al_2O_3$) powder, e.g., aluminum oxide powder particles of about 0.01 to about 5 microns; other ceramic powder; zeolite powder; and combinations thereof.

The powder of the intermediate layer can have a particle size that assists in preventing undesired intermetallic diffusion between the porous metal substrate and a dense gas-selective membrane. In one embodiment, the powder can have an average particle size of at least about 0.01 micron such as at least about 0.1, 0.5, 1, or at least about 5 microns. In some embodiments, the powder can have an average particle size of less than 5 microns such as less than 1, 0.5, 0.1, or less than 0.01 microns. In one embodiment, the powder has an average particle size of about 0.5 to about 5 microns such as, for example, about 1 to about 5 microns or about 0.6 to about 2 microns.

In one embodiment, the intermediate layer is at least about 1, 2, 3, 4, or at least about 5 microns thick. For example, the intermediate layer can be about 1 to about 10, such as about 1 to about 5 or about 5 to about 10 microns thick. In one embodiment, the intermediate layer is not significantly less porous to helium gas flux than the porous substrate. The intermediate layer can have an average pore size that is less than the average pore size of the porous metal substrate. In one embodiment, the largest pore of the intermediate layer is smaller than the largest pore of the porous metal substrate.

The intermediate layer can protect against intermetallic diffusion between the porous metal substrate and the dense gas-selective membrane. In some embodiments, intermetallic diffusion can occur between the porous metal substrate and the intermediate layer, but this diffusion does not substantially impair the performance of the dense gas-selective membrane. In one aspect of the present invention, the intermediate layer can include at least one metal that enhances the gas permeability of the dense gas-selective membrane upon intermetallic diffusion of the metal into the membrane. For example, the intermediate layer can further include at least one material having a Tamman temperature less than or about equal to the Tamman temperature of the dense hydrogen-selective membrane. In one embodiment, the intermediate layer further includes at least one material selected from the group consisting of silver, gold, copper, cerium and yttrium.

In some embodiments, intermetallic diffusion of some species between the intermediate layer and the dense gas-selective membrane enhances the permeability of the membrane. Without wishing to be held to any particular theory, intermetallic diffusion of species at concentrations that enhance membrane permeance between the intermediate layer and the dense gas-selective membrane is not thought to be harmful to the gas selectivity of the membrane. For example, the formation of a palladium alloy via diffusion of intermediate layer atoms into a dense hydrogen-selective membrane can enhance the hydrogen permeability of a dense hydrogen-selective membrane that includes palladium or alloy thereof. In some embodiments, the intermediate layer includes palladium, silver, gold, copper, cerium and/or yttrium, the dense gas-selective membrane includes palladium, and intermetallic diffusion of one or more of these metals from the intermediate layer into the dense gas-selective membrane improves the selective gas permeation through the membrane. Preferably, in one embodiment, the intermediate layer does not contain a concentration of a material which causes a substantial reduction in the performance of the dense gas-selective membrane upon diffusion of that material into the membrane.

In some embodiments, the intermediate layer of the present invention can improve adhesion of the dense gas-selective membrane to the porous metal substrate. For example, during a gas separation operation, the composite gas separation modules described herein can avoid membrane blistering, delamination and/or cracking even when operating at high temperatures and/or for extended periods of time. Without wishing to be held to any particular theory, the improvement in adhesion can result from inter-diffusion of the metal particles of the intermediate layer and/or intermetallic diffusion between the intermediate layer and the porous metal substrate on one side and the dense gas-selective membrane on the other side. For example, inter-diffusion can occur with some components when the composite gas separation module is heated to operational temperatures (e.g., about 350° C. to about 600° C.).

The composite gas separation module can further include a substrate surface treatment underlying the intermediate layer, as described infra. For example, a layer of a ceramic can be bonded to the porous metal substrate and underlie the intermediate layer. The ceramic can include oxides, nitrides, and/or carbides, for example, iron oxide, iron nitride, iron carbide and/or aluminum oxide.

The composite gas separation module can also further comprise a layer of a metal selected from the group consisting of palladium, gold and platinum, wherein the layer of metal overlies the porous metal substrate and/or a substrate surface treatment and underlies the intermediate layer. Such deposits of metal are discussed infra.

The composite gas separation module includes a dense gas-selective membrane, wherein the dense gas-selective membrane overlies the intermediate layer. In one embodiment, the dense gas-selective membrane is selectively permeable to hydrogen, e.g., the dense gas-selective membrane is a dense hydrogen-selective membrane and can include one or more hydrogen-selective metals or alloys thereof. "Hydrogen-selective metals" include, but are not limited to, niobium (Nb), tantalum (Ta), vanadium (V), palladium (Pd), platinum (Pt), zirconium (Zr) and hydrogen-selective alloys thereof. Palladium and alloys of palladium are preferred. For example, palladium can be alloyed with at least one of the metals selected from the group consisting of copper, silver, gold, platinum, ruthenium, rhodium, yttrium, cerium and indium.

Where the gas separation module is to be used at temperatures below about 300° C., the dense gas-selective membrane can be formed of a palladium alloy such as, for example, an alloy of about 75 to about 77 weight percent palladium and about 25 to about 23 weight percent silver. An alloy is typically preferred at low temperatures because pure palladium can undergo a phase change in the presence of hydrogen at or below about 300° C. and this phase change can lead to embrittlement and cracking of the membrane after repeated cycling in the presence of hydrogen.

In one embodiment, the dense gas-separation membrane can include one or more non-metallic components. In another embodiment, the dense gas-separation membrane can include one or more components that are not gas-selective materials, e.g., components that are not hydrogen-selective materials.

In one embodiment, the thickness of the dense gas-selective membrane is less than about 3 times the diameter of the largest pore of the porous substrate. For example, the thickness of the dense gas-selective membrane can be less than about 2.5, 2, or less than about 1.5 times the diameter of the largest pore of the porous substrate. While the thickness of the dense gas-selective membrane can depend, among other factors, on the size of the largest pores in the porous substrate, in some embodiments the dense gas-selective membrane is less than about 25, 20, 15, 12 or less than about 10 microns in thickness. For example, in one embodiment, the thickness of the dense gas-selective membrane is less than about 14 microns such as about 3 to 14 microns. In one particular embodiment, the dense gas-selective membrane is of substantially uniform thickness.

In one aspect, performance of the composite gas separation modules described herein can be assessed by measuring hydrogen flux through the module during operation. For example, hydrogen flux through the composite gas separation modules, in one embodiment, is at least about 4 ($m^3$/$m^2$-hr)$_{STP}$ at about 350° C. and with a hydrogen partial pressure difference of about 1 bar.

In one aspect, the invention includes a method for fabricating a composite gas separation module, comprising the steps of: (a) applying an intermediate layer that includes a powder having a Tamman temperature higher than the Tamman temperature of the porous metal substrate over a porous metal substrate; and (b) applying a dense hydrogen-selective membrane over the intermediate layer, thereby forming the composite gas separation module. Suitable porous metal substrates, intermediate layers and dense hydrogen-selective membranes are described supra. A description of suitable fabrication techniques follows.

In a preferred fabrication method, any contaminants are initially cleaned from the substrate, for example, by treating the substrate with an alkaline solution such as by soaking the substrate in an approximately 60° C. ultrasonic bath for about half an hour. Cleaning is typically followed by rinsing such as, for example, wherein the substrate is sequentially rinsed in tap water, deionized water and isopropanol. Preparation of the porous substrate can also include surface treatment; formation of an additional intermetallic diffusion barrier such as by oxidizing the substrate, described infra; surface activation, described infra; and/or deposition of a metal such as palladium, gold or platinum, described infra, prior to applying the intermediate layer over the porous metal substrate.

The intermediate layer is generally applied over the porous metal substrate prior to application of a dense gas-selective membrane. In one embodiment, the intermediate layer is first applied over the porous metal substrate and includes a powder having a Tamman temperature higher than the Tamman temperature of the porous metal substrate and then a dense gas-selective membrane (e.g., a hydrogen selective membrane) is applied over the intermediate layer.

The intermediate layer can be applied using any of a number of techniques for applying a powder to a porous surface. For example, the intermediate layer can be applied using powder particles transported to the support by a gas (e.g., a gas stream). In other embodiments, the powder particles are pressed and/or rubbed onto the support. In one embodiment, the intermediate layer is applied by depositing the powder from a slurry or suspension. For example, in one embodiment, the intermediate layer can be applied by depositing the powder from a liquid-based, e.g., water-based, slurry or suspension. In some embodiments, the intermediate layer can be applied by depositing several powders of varying compositions and/or particle size, e.g., from a slurry or suspension containing several different materials. For example, in one embodiment, a water-based slurry is prepared by mixing water with tungsten particles, silver particles, copper oxide particles, aluminum oxide particles, ceramic particles, zeolite particles, and/or a combination thereof.

The slurry can contain, e.g., about 0.1 to about 30 g/L powder particles. For example, the slurry can contain about 0.1 to about 20, about 1 to about 15, about 5 to about 15, about 8 to about 12, or about 10 g/L powder particles having a Tamman temperature higher than the Tamman temperature of the porous metal substrate. For example, in one embodiment, the slurry can contain about 0.1 to about 20 g/L tungsten powder.

In some embodiments, an additive that prevents or slows agglomeration and/or sedimentation of powder particles is added to the slurry or suspension. In one embodiment, a polymer such as poly(ethylene glycol) (PEG) is added to the slurry or suspension. For example, in one embodiment, a slurry can contain about 1 to about 25, about 5 to about 15, or about 10 grams/liter polymer such as PEG. In one specific embodiment, the slurry can contain about 5 to about 15 grams metal particles, such as tungsten powder particles, and about 5 to about 15 grams polymer such as PEG. In some embodiments, an additive can enhance the mechanical properties of the filter cake during handling, e.g., by acting as a binder.

The intermediate layer can applied by depositing the powder from a slurry or suspension by filtering the slurry through a porous support. For example, in one embodiment, the powder is deposited on a porous support as a filter cake after a slurry is filtered through the porous support. In some embodiments, a vacuum is applied to one side of a porous support and a slurry is applied to the opposite side of the porous support. Thus, a filter cake can accumulate on the side of the support to which the slurry is applied and filtrate can be collected on the side of the support to which the vacuum is applied. In one embodiment, a vacuum is applied to the tube side of a tubular support and a slurry is applied to the membrane side of the tubular support.

In some embodiments, the intermediate layer is applied using a liquid-based composition such as a water-based slurry. Following deposition of a powder, the liquid-wetted powder can be dried. In other embodiments, the powder can be kept wet as subsequent application of a dense hydrogen-selective membrane is made over the intermediate layer. For example, in some embodiments, the filter cake applied by a slurry or suspension is dried prior to a subsequent surface activation step. In other embodiments, the filter cake applied by a slurry or suspension is kept wet prior to a subsequent surface activation step.

In one embodiment, the present invention can include the step of depositing a hydrogen-selective metal on the intermediate layer, thereby forming a coated substrate and abrading the surface of the coated substrate, thereby forming a polished substrate, prior to formation of the dense gas-selective membrane (e.g., a dense hydrogen-selective membrane) over the intermediate layer. Abrasion of a deposited material is further described infra.

Following application of the intermediate layer, a dense gas-selective membrane is applied over the intermediate layer. For example, a dense gas-selective membrane can be applied by depositing a gas-selective metal, e.g., a hydrogen-selective metal, over the intermediate layer. Without wishing to be held to any particular theory, it is believed that by depositing a layer of metal (e.g., a hydrogen-selective metal) on the intermediate layer, the intermediate layer can be mechanically stabilized.

In one embodiment, palladium or an alloy thereof is deposited, e.g., electrolessly plated, over the intermediate layer, thereby forming a dense gas-selective membrane. Application of the dense gas-selective membrane can include surface activating the intermediate layer prior to depositing dense gas-selective membrane components. In some embodiments, a vacuum is applied to one side of a porous support and an activation composition is applied to the opposite side of the porous support. In one embodiment, a vacuum is applied to the tube side of a tubular support and an activation composition is applied to the membrane side of the tubular support.

Components of the dense gas-selective membrane, e.g., a hydrogen-selective metal or an alloy thereof, can be deposited over the intermediate layer using any of the techniques known in the art for depositing such materials on a support. For example, a component of the dense gas-selective membrane can be deposited on the support using electroless plating, thermal deposition, chemical vapor deposition, electroplating, spray deposition, sputter coating, e-beam evaporation, ion beam evaporation or spray pyrolysis. In some embodiments, a vacuum is applied to one side of a porous support and an plating composition, such as an electroless plating solution, is applied to the opposite side of the porous support. In one embodiment, a vacuum is applied to the tube side of a tubular support and a plating composition is applied to the membrane side of the tubular support.

An alloy of a gas-selective metal can be deposited over the intermediate layer as a component of the dense gas-selective membrane. In one embodiment, a palladium/silver alloy is formed by first depositing palladium onto the support by electroless deposition and then depositing silver, also by electroless deposition, onto the support. An alloy membrane layer can then be formed by heating the silver and palladium layers, for example, to about 500° C. to about 1000° C. in an inert or hydrogen atmosphere. In one embodiment, metal components can be co-deposited onto the support to form a layer of a finely divided mixture of small regions of the pure metal components. In another embodiment, a technique such as sputtering or chemical vapor deposition is used to simultaneously deposit two or more metals to form an alloy layer on the support.

In one aspect, the present invention includes a method for selectively separating hydrogen gas from a hydrogen gas-containing gaseous stream, by which method, hydrogen gas is at least partially partitioned from the gaseous stream by passing through a dense hydrogen-selective membrane. The method includes directing the hydrogen gas-containing gaseous stream to a composite gas separation module, wherein the composite gas separation module includes: (a) a porous metal substrate; (b) an intermediate layer that includes a powder having a Tamman temperature higher than the Tamman temperature of the porous metal substrate and wherein the intermediate layer overlies the porous metal substrate; and (c) a dense hydrogen-selective membrane, wherein the dense hydrogen-selective membrane overlies the intermediate layer. In one embodiment, a layer of a ceramic can be bonded to the porous metal substrate and underlies the intermediate layer. The intermediate layer can be formed using any of the techniques described herein. Preferably, the dense hydrogen-selective membrane includes palladium or an alloy thereof.

When the composite gas separation module is exposed to a hydrogen gas-containing atmosphere (e.g., a gaseous stream), the dense hydrogen-selective membrane can cause the hydrogen gas to dissociate and diffuse through the membrane. As a result, hydrogen is selectively removed from the hydrogen gas-containing gaseous stream into a volume on the opposite side of the gas separation module. A pressure gradient of hydrogen, wherein the hydrogen partial pressure of the hydrogen gas-containing gaseous stream is greater than the hydrogen partial pressure on the opposite side of the gas separation module, can be maintained to increase the flux of hydrogen through the dense hydrogen-selective membrane of the composite gas separation module.

Specific applications for which the composite gas separation module is well-suited include, but are not limited to, hydrogenation/dehydrogenation reactions, methane/steam reforming reactions, and other steam reforming reactions or autothermal reforming of methane. In one embodiment, the present invention includes the step of reacting hydrogen gas-producing reactants to produce the gaseous stream from which hydrogen gas is at least partially partitioned.

In dehydrogenation reactions, the reaction products include hydrogen gas. Reactants, at least one of which includes molecularly-bound hydrogen, can be placed surrounding, between or within composite gas separation modules as described herein. As the reaction proceeds, hydrogen gas can be removed by the composite gas separation module from the volume wherein the reactants react. Since these reactions are generally thermodynamic equilibrium controlled, the reaction can be limited by the accumulation of hydrogen gas and the reaction reaches equilibrium when a sufficient quantity of hydrogen has accumulated. When hydrogen is separated from the reactants, however, conversion can reach 95% or more. In a methane/steam reforming, methane and steam can be passed through or around a tubular composite gas separation module in the presence of a catalyst. The methane and steam react to produce carbon dioxide and hydrogen, and the hydrogen can be dissociated through the dense hydrogen-selective membrane and thereby separated from the other gases.

Details of specific method steps that can be employed in various embodiments of the invention follow under separate subheadings.

Substrate Surface Treatments

The present method for forming a composite gas separation module can also include surface treating the porous metal substrate prior to application of the intermediate layer over the porous metal substrate. For example, the present method for forming a composite gas separation module can also include forming an additional intermetallic diffusion barrier on the porous substrate prior to applying the intermediate layer over the porous substrate. In one embodiment, forming an additional intermetallic diffusion barrier (e.g., an oxide layer intermetallic diffusion barrier) includes oxidizing the substrate in situ.

The method can include the step of forming a ceramic coating on the surface of the porous metal substrate prior to applying the intermediate layer over the porous metal substrate. In one embodiment, a metal present at the surface of the porous metal substrate is oxidized. Thus, the metal present at the substrate surface is in an oxidized state, bonded to the substrate. In another embodiment, a material is deposited on the surface of the porous metal substrate and is subsequently oxidized prior to applying the intermediate layer over the porous metal substrate. In other embodiments, a nitride layer can be formed on the surface of the porous metal substrate (prior to applying the intermediate layer over the porous metal substrate), for example, by oxidizing the substrate in an ammonia-bearing or nitrogen-based atmosphere or a carbide layer can be formed, for example, by oxidizing the porous metal substrate in an atmosphere comprising hydrocarbon gases. To enhance the stability of the composite gas separation module, particularly where it will be used at high temperatures, the substrate can be further coated with a second protective layer, such as with a layer of alumina, silica, mullite, cordierite, zirconia, titania, tantalum oxide, tungsten or magnesium oxide.

Composite gas separation modules having a surface treated substrate and methods for surface treating a substrate are described in U.S. Pat. No. 6,152,987 issued on Nov. 28, 2000, to Ma, et al., the entire contents of which is incorporated herein by reference.

Additional Intermetallic Diffusion Barrier

The inventive methods described herein can also include forming an additional intermetallic diffusion barrier on the porous substrate prior to or following depositing the intermediate layer over the porous metal substrate. In one embodiment, forming an additional intermetallic diffusion barrier (e.g., an oxide layer intermetallic diffusion barrier) includes oxidizing the substrate in situ as described under the heading Substrate Surface Treatments, supra. In another embodiment, an additional intermetallic diffusion barrier includes one or more layers of deposited metal. For example, applying a porous metal layer intermetallic diffusion barrier can include applying one or more porous layers of metal over the surface of the porous substrate.

In one embodiment, a porous metal layer intermetallic diffusion barrier includes palladium or an alloy thereof and a Group IB metal, such as copper or silver, or an alloy thereof. For example, the intermetallic diffusion barrier can include alternating porous layers of palladium and a Group IB metal or alloys thereof. Methods for fabricating composite gas separation modules that include intermetallic diffusion barriers are further discussed in U.S. Provisional Patent Application No. 60/457,061, entitled "Method of Making Intermetallic Diffusion Barrier," by Ma, et al., filed on Mar. 21, 2003, and in U.S. patent application Ser. No. 10/804,846, entitled "Composite Gas Separation Modules Having Intermediate Porous Metal Layers," by Ma, et al., each incorporated by reference herein in their entirety.

Metal Deposition on the Porous Substrate

The present inventive methods for forming a composite gas separation module can also include depositing a metal selected from the group consisting of palladium, gold and platinum on the porous substrate prior to applying the intermediate layer over the porous substrate. Preferably, this deposit of metal on the porous substrate does not significantly increase the transport resistance of the substrate. In one embodiment, the thickness of this metal deposit is less than about 10, 7, 5, 3, or less than about 1 percent of the ultimate thickness of the dense gas-selective membrane.

This procedure can include surface activating the porous substrate, as described infra, prior to depositing the metal on the porous substrate. This process of depositing a metal selected from the group consisting of palladium, gold and platinum on the porous substrate can help protect the substrate from post-synthesis corrosion. In one embodiment, the deposition of palladium, gold and/or platinum on the porous substrate is made following formation of an additional intermetallic diffusion barrier such as an oxide layer intermetallic diffusion barrier, described supra.

In one embodiment, a small quantity of the metal, sufficient to cover the pore walls of the substrate, is deposited on the porous substrate without a significant reduction of the substrate porosity. Typically, the deposition of palladium, gold and/or platinum on the porous substrate is made by surface activating and plating on the side of the substrate opposite to the side on which a gas-selective membrane will be formed. For example, in one embodiment, a deposit of palladium, gold and/or platinum is formed from the inside of a substrate tube (e.g., using an electroless plating solution) and a dense gas-selective membrane is subsequently formed on the outside of the substrate tube.

Surface Activation

The present method for forming a composite gas separation module can include surface activating a support prior to deposition of a desired material (e.g., the intermediate layer, components of the dense gas-selective membrane or a metal deposited on the porous substrate). For example, a porous substrate can be surface activated prior to depositing a hydrogen-selective metal or alloy thereof on the support. In one embodiment, the surface of the intermediate layer is surface activated prior to applying a dense gas-selective membrane over the intermediate layer. In addition, applying a dense gas-selective membrane over the intermediate layer can include surface activating the support between applications of components of the dense gas-selective membrane.

In one embodiment, surface activation includes seeding the surface of the support with nuclei of a hydrogen-selective metal such as with palladium nuclei. Without wishing to be held to any particular theory, it is believed that when a surface activated support is electrolessly plated, the palladium nuclei on the surface activated substrate initiate, in the presence of a reducing agent such as hydrazine, an autocatalytic process of reducing a metastable palladium salt complex on the surface.

In one embodiment, the support is surface activated by treating it with liquid activation compositions such as, for example, aqueous stannous chloride ($SnCl_2$) and palladium chloride ($PdCl_2$). In one embodiment, the support is surface activated to seed substantially all of the surfaces of the support with nuclei of a hydrogen-selective metal, e.g., palladium. For example, the support can be surface activated by first immersing it in the aqueous acidic $SnCl_2$ bath (e.g., an about 1 g/L aqueous $SnCl_2$ bath) for a suitable time, such as about five minutes, to sensitize the support. Then, the support can be immersed for a suitable time, such as about five minutes, in an aqueous acidic $PdCl_2$ bath (e.g., an about 0.1 g/L aqueous $PdCl_2$ bath) to seed the support with palladium nuclei. The temperature of each bath is typically about 15° C. to about 25° C., for example, about 20° C. Ordinarily, after each immersion in the $SnCl_2$ bath, the support is rinsed with water, for example, deionized water. Typically, after each immersion in the $PdCl_2$ bath, the support is rinsed first with hydrochloric acid, preferably dilute hydrochloric acid, for example, 0.01 M hydrochloric acid, and then with water. Rinsing with hydrochloric acid can be used to prevent hydrolysis of the palladium ions.

During rinsing, after immersion of the support in the acidic stannous chloride bath, stannous ions on the surface of the support can be partially hydrolyzed to form relatively-insoluble products, for example, $Sn(OH)_{1.5}Cl_{0.5}$ and other more complicated hydroxyl-chlorides. The products of hydrolysis can be strongly attached to the surface as a layer having a thickness on the order of a few angstroms. The composition, structure and thickness of this layer can depend on factors such as the ratio of hydrochloride to stannous chloride; the structure, roughness and shape of the support surface; and the hydrodynamic regime of rinsing. This layer is thought to reduce the $Pd^{2+}$ ions from the $PdCl_2$ bath to $Pd^0$ to form the nuclei or seeds on the surface of the support.

Generally, the above-described process of treating the support with $SnCl_2$ and then with $PdCl_2$ is repeated as necessary to provide a surface activated support. The exact number of repetitions of treatment with $SnCl_2$ and then with $PdCl_2$ depends on the intensity of surface activation that is desired. Typically, the treatment with $SnCl_2$ and then with $PdCl_2$ is preformed at least one time such as about 2 to about 10 times or, preferably, about 2 to about 5 times. In one preferred embodiment, the surface activated support has a uniform dark-brown color and a smooth surface.

Thus, the surface activated support can include a structure having a number of thin layers of palladium nuclei, each formed after performing a surface activation process (such as by treating the support with $SnCl_2$ and then with $PdCl_2$). These preseeded palladium nuclei can reduce the induction period of the autocatalytic process at the start of electroless palladium plating.

While the surface activation of a support using palladium nuclei has been illustrated above, methods for forming surface activated supports suitable for the plating of other metals are well-known to those of ordinary skill in the art.

Alternatively, a metal or alloy (e.g., palladium or alloy thereof) can be deposited on a support without surface activation of the support. However, absent surface activation, plating of the support with the metal can be slow.

Metal Deposition

Deposition of a material on a support can include plating the support with a metal (e.g., a hydrogen-selective metal). For example, depositing a metal on a support, such as depositing metal on the porous metal substrate, applying a porous metal layer intermetallic diffusion barrier and/or applying the dense gas-selective membrane can employ an electroless plating technique such as the method that follows.

In one embodiment, plating is conducted by electroless plating. For example, palladium deposition can occur according to the autocatalytic reactions of Chemical Equations I and II:

or

In one embodiment, a plating solution is prepared that contains the following: 4.0 g/L $Pd(NH_3)_4Cl_2 \cdot H_2O$; 198 mL/L $NH_4OH$ (28%); 40.1 g/L $Na_2EDTA$; and 5.6-7.6 mL/L $H_2NNH_2$ (1 M). This plating solution can be maintained at a temperature from about 20° C. to about 90° C. such as, for example, about 60° C. Typically, the plating solution has a pH of approximately 10.4 and is provided in a quantity sufficient to provide approximately 3.5 cm³ of solution per square centimeter of plating area.

The plating solution can be contained in a plating vessel which can be jacketed to provide temperature control. For example, the plating vessel can be kept in a temperature controlled water bath. The support is typically introduced to the plating solution to begin deposition of the palladium.

After about one hour of steady-state deposition of palladium onto the support, the plating activity decreases with a depletion of palladium ions and hydrazine ($H_2NNH_2$) and a decrease in the pH of the plating solution. After depletion of the plating solution, a new solution can be provided and the procedure repeated. A stable high rate of deposition for each plating can be achieved not only by changing the plating solution, but also by carefully rinsing the deposited metal between platings. Typically, the deposited metal is rinsed a minimum of about five times, e.g., with deionized water at about 50° C. to about 60° C. for about 2 to about 5 minutes.

As alternatives to electroless plating, a material, e.g., palladium, can be deposited on the support by other suitable metal deposition techniques known in the art, such as thermal deposition, chemical vapor deposition, electroplating, spray deposition, sputter coating, e-beam evaporation, ion beam evaporation or spray pyrolysis.

Selective Plating

In one embodiment, the present invention can further include selectively surface activating a support proximate to a defect and preferentially depositing a material on the selectively surface activated portion of the support. For example, a support can be selectively plated with a hydrogen-selective metal (or an alloy thereof) following application of the intermediate layer. In one embodiment, applying a dense hydrogen-selective membrane over the intermediate layer can include selectively plating the support with a hydrogen-selective metal or an alloy thereof.

Methods for fabricating gas separation modules that include selectively surface activating a support proximate to a defect and preferentially depositing a material on the selectively surface activated portion of the support are discussed in U.S. Provisional Patent Application No. 60/456,931, entitled "Method of Producing Thin Palladium and Palladium Alloy Layers," by Ma, et al., filed on Mar. 21, 2003, and in U.S. patent application Ser. No. 10/804,848, "Method for Curing Defects in the Fabrication of a Composite Gas Separation Module," by Ma, et al., each incorporated by reference herein in their entirety.

Abrasion of a Deposited Material

In one embodiment, the present invention includes the further step of abrading a deposited material. For example, in one embodiment, a material, such as a gas-selective material, is applied over the intermediate layer prior to applying the dense gas-selective membrane, and the product can then be abraded prior to applying the dense gas-selective membrane. In another embodiment, a first component of the dense gas-selective membrane can be applied over the intermediate layer, the deposited first component can be abraded, and a second component of the dense gas-selective membrane can be applied over the abraded, deposited first component.

Abrasion of a deposited material can help to reduce or prevent the repetition of an intermediate layer's possible porous morphology in subsequent applications of materials, e.g., gas-selective materials such as hydrogen-selective metal or an alloy thereof. In one embodiment, the intermediate layer is formed over the porous substrate; the intermediate layer is abraded, thereby forming a polished intermediate layer; and a gas-selective material is deposited on the polished intermediate layer.

Methods for fabricating composite gas separation modules that include abrading a deposited material are further discussed in U.S. Provisional Patent Application No. 60/456,930, entitled "Method for Producing Dense Selective Layers," by Ma, et al., filed on Mar. 21, 2003, and in U.S. patent application Ser. No. 10/804,847, "Method for Fabricating Composite Gas Separation Modules," by Ma, et al., each incorporated by reference herein in their entirety.

Reacting Chloride to Form Phosphate

A surface activated support, the dense gas-selective membrane, or other intermediate products described herein can contain chloride anions. Residual metal chlorides, resulting from surface activation or electroless plating steps, can remain in the pores of the support. In one embodiment, the invention includes removing residual metal chlorides, for example, by treatment with an aqueous phosphoric acid solution, e.g., 10% phosphoric acid solution. For example, the treatment can include application of 10% phosphoric acid solution at room temperature for a time sufficient to convert residual metal chlorides to metal phosphates, e.g., about 30 minutes, followed by appropriate rinsing and drying, e.g., rinsing with deionized water for about 30 minutes and drying at about 120° C. for at least about 2 hours.

Therefore, the present method for forming a composite gas separation module can further comprise the step of reacting chloride anions to form metal phosphates. For example, residual metal chlorides can be removed between depositions of dense gas-selective membrane components. Treatment with an aqueous phosphoric acid solution can promote exchange of chloride anions to form insoluble metal phosphates. The removal of metal chlorides from the pores can reduce or substantially eliminate corrosion of the support during subsequent plating steps and post-synthesis. In addition, the formed metal phosphates can be more stable than metal chlorides in a dense hydrogen-selective membrane at high temperatures. This method can retard the formation of metal chlorides in the support as well as retard the formation of metal chlorides used in electroless plating solutions and activation compositions.

Composite gas separation modules and methods for their fabrication suitable for use in conjunction with the present invention are described in U.S. Pat. No. 6,152,987, cited supra, and also in U.S. Provisional Patent Application No. 60/456,931, cited supra; U.S. Provisional Patent Application No. 60/457,061, entitled "Method of Making Intermetallic Diffusion Barrier," by Ma, et al., filed on Mar. 21, 2003; U.S. Provisional Patent Application No. 60/456,930, cited supra; U.S. Provisional Patent Application No. 60/467,493, entitled "High Melting Point Metal Diffusion Barriers for Composite Palladium Porous Stainless Steel Membranes," by Ma, et al., filed on May 2, 2003; U.S. patent application Ser. No. 10/804,848, entitled "Method for Curing Defects in the Fabrication of a Composite Gas Separation Module," by Ma, et al., cited supra; and U.S. patent application Ser. No. 10/804,847 entitled "Method for Fabricating Composite Gas Separation Modules," by Ma, et al., cited supra, each of which is incorporated herein by reference in its entirety.

EXEMPLIFICATION

The invention will now be further and specifically described by the following examples which are not intended to be limiting.

Example 1

This example describes the fabrication of a composite structure having a dense hydrogen-selective membrane, an intermediate layer that includes a tungsten powder, and a nominal 0.1 media grade porous 316L stainless steel ("PSS") support.

A 6 inch (15.24 centimeter (cm)) long, 1 inch (2.54 cm) outside diameter (O.D.) section of PSS tube, welded to sections of 1 inch (2.54 cm) O.D. dense, non-porous 316L stainless steel tube on each end, was obtained from Mott Metallurgical Corporation. Contaminants were removed by cleaning the tube in an ultrasonic bath with alkaline solution at 60° C. for one half hour. The tube was then sequentially rinsed using tap water, deionized water and isopropanol. The tube was oxidized in static air at 400° C. for 12 hours wherein the rates of heating and cooling were 3° C. per minute.

A thin layer of tungsten powder was then applied to the outer surface of the PSS support by the following room temperature filtration operation. First, a slurry of the tungsten powder was prepared. The slurry included 1 liter (L) deinoized water (DI) water, 10 grams (g) poly(ethylene glycol) (PEG) (average molecular weight (MW) 3,400) (Sigma-Aldrich, St. Louis, Mo., Cat. No. 20,244-4) and 20 g tungsten powder having a particle size of about 1 to 5 microns. (Alfa Aesar, Ward Hill, Mass., tungsten powder (average particle size (APS) 1 to 5 microns), Stock No. 10400, Lot No. E03M02.)

The exterior of the support was exposed to the slurry in a closed plastic cell while a vacuum was applied to the inside of the support tube. A vacuum pump was used to reduce the absolute pressure to about 0 kilopascals (kPa) on the inside of the support tube. The closed plastic cell containing the slurry and the support was shaken throughout filtration of the slurry through the support. Some of the liquid from the slurry was thereby drawn through the porous support and a filter cake of tungsten powder formed on the outside of the support. Filtration of the slurry using this technique was performed for one hour. The support and filter cake were dried in an oven at 120° C. overnight. This procedure failed to produce a uniform filter cake coverage of the support. The filter cake was removed using a brush after drying.

A new filter cake was then applied to the support by a variation of the procedure described above. A fresh slurry was made with the same composition as described supra. The exterior of the support was immersed into an open cylinder with constantly stirring slurry for about 90 seconds while a vacuum was applied to the inside of the support tube (absolute pressure of about 0 kPa). The support was removed from the slurry and dried under vacuum at room temperature about one hour and then it was dried without vacuum in oven at 120° C. overnight. Tungsten powder thickness was estimated as 17.3 microns. The tungsten powder layer was uniform and it appeared strong enough to continue with subsequent activation and plating.

An attempt was then made to surface activate the support using aqueous stannous chloride ($SnCl_2$) and palladium chloride ($PdCl_2$) as described supra. However, a substantial quantity of the tungsten powder fell off the support into the activation solutions. The support was rinsed in DI water and dried at 120° C. overnight. The remaining tungsten powder was removed from the dried surface of the support using an artist's brush and the support was immersed in DI water in an ultrasonic bath for 15 min and then dried at 120° C. overnight.

A new filter cake was then applied to the support by a variation of the procedure described above. A new slurry was made that contained 1 L DI water, 10 g poly(ethylene glycol) (PEG), and 10 g of the APS 1 to 5 micron tungsten powder described above. The exterior of the support was then exposed to the slurry for about 90 seconds while a vacuum from an water aspirator (absolute pressure of about 51 kPa) was applied to the inside of the support tube. The support and resulting filter cake were then immediately activated without drying using the following procedure.

The support and filter cake were surface activated by sequentially immersing the exterior of the support in aqueous baths of $SnCl_2$ and $PdCl_2$ while a vacuum from an water aspirator (absolute pressure of about 51 kPa) was applied to the inside of the support tube. The exterior of the tube was immersed in 500 mL of aqueous $SnCl_2$ (1 g/L) at 20° C. for about 5 minutes and was subsequently rinsed with deionized water. The exterior of the tube was then immersed in 500 mL of aqueous $PdCl_2$ (0.1 g/L) at 20° C. for about 5 minutes followed by rinsing first with 0.01 molar hydrochloric acid and then with deionized water. During surface activation with vacuum, it was necessary to add small amounts of the activation solutions to replenish the liquid drawn through the support by the vacuum. The above-described surface activation cycle was performed a total of two times. The support was then dried for 1 hour at room temperature while the above-described vacuum was applied to the interior of the tube. The support was then dried overnight in an oven (with no vacuum applied) at 120° C. This procedure produced a uniform dried tungsten filter cake (e.g., an intermediate layer) with a thickness of about 3.4 microns, determined gravimetrically based on the weight of the dried tungsten powder and trace PEG with no correction for the porosity of the filter cake.

Following surface activation, a porous palladium/silver layer was applied over the intermediate layer of tungsten powder by electroless plating while a vacuum from an water aspirator (absolute pressure of about 51 kPa) was applied to the inside of the support. Thin layers of palladium (Pd) and silver (Ag) were sequentially deposited using electroless plating as described below.

Palladium layers were deposited on the tube by electroless plating according to the following procedure. The tube was immersed in a plating solution at room temperature. The plating solution was composed of 4 grams $Pd(NH_3)_4 Cl_2.H_2O$/liter, 198 milliliters $NH_4OH$ (28 weight percent)/liter, 40.1 grams $Na_2EDTA$/liter, and 6 milliliters aqueous $H_2NNH_2$ (1 M)/liter. The plating solution and tube were placed in a water bath at 60° C. During plating, the level of plating solution was kept constant by adding a small quantity of plating solution for loss of solution to the vacuum. After the palladium in the plating solution was depleted, the tube was removed and rinsed with deionized water at 60° C. with 4 to 5 rinses.

Silver layers were deposited on the tube by electroless plating according to the following procedure. The tube was immersed in a plating solution at room temperature. One liter of the plating solution contained 0.519 grams $AgNO_3$, 198 milliliters of concentrated aqueous $NH_4OH$ (28 weight percent), 40.1 grams $Na_2EDTA$, and 6 milliliters 1M aqueous $H_2NNH_2$, and the balance was DI water. The plating solution and tube were placed in a water bath at 60° C. During plating, the level of plating solution was kept constant by adding a small quantity of plating solution for loss of solution to the vacuum. After the silver in the plating solution was depleted, the tube was removed and rinsed with deionized water at 60° C. with 4 to 5 rinses.

Each metallic layer was applied by contacting the tube with a plating solution for 90 minutes and was followed by rinsing the tube with deionized water, but not with intermediate activation, drying or sintering. The specific layers, an estimate of the layer thicknesses, and the order of their application were Pd (about 4.5 microns), Ag (about 0.9 microns), Pd (about 4.5 microns), Ag (about 0.9 microns) and Pd (about 4.5 microns) (a total of five layers). (Thickness estimates were based on time of contact with the plating solutions. The average rate of metal deposition was determined for a test piece of a similar support and the identical plating solution and activation procedure. The test pieces were activated, then plated for 90 minutes and then rinsed, dried and weighed. From that it was possible to estimate the thickness which was deposited over 90 minutes.) The deposition rate under a vacuum (absolute pressure range of about 51 to about 67 kPa) increased three times as compared to experiments in which deposition was performed without vacuum applied. After applying the above-described palladium and silver layers, the membrane was dried at 120° C. in air overnight. Helium flux was measured across the membrane thus formed. These measurements indicated that the membrane was not gas tight at this point. The total thickness of the porous palladium/silver layer after these steps was 16.4 microns (determined gravimetrically). The membrane was slightly sanded with 2,400 grit sandpaper (Waterproof Silicon Carbide, P=2400, Struers, Inc., Westlake, Ohio). The final thickness of the porous palladium/silver layer after sanding was 12.8 microns (determined gravimetrically).

Then, the membrane was surface activated using three surface activation cycles, described supra but under a light aspirator vacuum (absolute pressure range of about 78 to about 84 kPa) applied to the inside of the support. Palladium was then deposited on the exterior of the tube by electroless plating according to the above-described procedure, with an aspirator vacuum (absolute pressure range of about 78 to about 84 kPa) applied to the inside of the support, three times for 90 minutes each time (a total of 4.5 hours of plating). Between each of the 90 minute platings, the membrane was rinsed with DI water (at 60° C.) not less than three times. After the last plating and rinsing with DI water, the membrane was dried for 2 hours at 120° C. A total 9.4 microns of palladium, gravimetrically determined, was applied to the support. The membrane was slightly sanded with 2,400 grit sandpaper (Waterproof Silicon Carbide, Struers, Inc.). The thickness of the palladium layer after these steps was 6.4 microns (determined gravimetrically).

Then, the membrane was surface activated using three surface activation cycles, described supra, with an aspirator vacuum (absolute pressure range of about 78 to about 84 kPa) applied to the inside of the support. Palladium was then deposited on the exterior of the tube by electroless plating according to the above-described procedure, with an aspirator vacuum (absolute pressure range of about 78 to about 84 kPa) applied to the inside of the support, four times for 90 minutes each time (a total of 6 hours of plating). Between each of the 90 minute platings, the membrane was rinsed with DI water (at 60° C.) not less than three times. After the last plating and rinsing with DI water, the membrane was dried for 2 hours at 120° C. The thickness of the palladium layer after these steps was 16.2 microns (determined gravimetrically).

Then, the membrane was surface activated using two surface activation cycles, described supra under no vacuum. Palladium was then deposited on the exterior of the tube by electroless plating according to the above-described procedure without vacuum 5 times for 1.5, 1.5, 1.5, 2, and 2 hours, respectively, for a total of 8.5 hours of plating. Between each of the platings, the membrane was rinsed with DI water (at 60° C.) not less than three times. After the last plating and rinsing with DI water, the membrane was dried for 2 hours at 120° C. The thickness of the palladium layer after these steps was 22.6 microns (determined gravimetrically).

Then, the membrane was surface activated using two surface activation cycles, described supra under no vacuum. Palladium was then deposited on the exterior of the tube by electroless plating according to the above-described procedure without vacuum 3 times for 1.5, 1.5, and 2 hours, respectively, for a total of 5 hours of plating. Between each of the platings, the membrane was rinsed with DI water (at 60° C.) not less than three times. After the last plating and rinsing with DI water, the membrane was dried for 2 hours at 120° C. The thickness of the palladium layer after these steps was 27.6 microns (determined gravimetrically).

Then, the membrane was surface activated using two surface activation cycles, described supra under no vacuum. Palladium was then deposited on the exterior of the tube by electroless plating according to the above-described procedure without vacuum 3 times for 1.5, 2, and 2 hours, respectively, for a total of 5.5 hours of plating. Between each of the platings, the membrane was rinsed with DI water (at 60° C.) not less than three times. After the last plating and rinsing with DI water, the membrane was dried for 2 hours at 120° C. Thus, a final total of 33.6 microns of palladium, gravimetrically determined, had been applied to the support.

Helium leak and hydrogen permeance of this membrane were observed at 500° C. for over 800 hours. A maximum hydrogen permeance of 13.6 $(m^3/m^2\text{-h-atm}^{0.5})_{STP}$ was obtained and no decline in hydrogen permeance was observed over the entire test period. During this test, the membrane was periodically switched from hydrogen gas to helium gas to measure the leak (a pressure difference of 1 atmosphere (atm) was applied). This was done a total of 8 times. The helium leak at 500° C. increased from 0.4 to 3.7 standard cubic centimeters per minute (sccm) during the first 4 cycles (approximately 450 hours at 500° C.) then remained at a relatively stable value between 3.7 and 4.0 sccm for all measurements thereafter. The time required to reach a plateau in the helium leak corresponded to the time required to reach the maximum stable hydrogen permeance.

Example 2

This example describes the fabrication of a composite structure that includes a dense hydrogen-selective membrane, an intermediate layer that includes an aluminum oxide ($Al_2O_3$) powder, and a nominal 0.1 media grade porous HASTELLOY® C-22® support. (HASTELLOY® C-22® is a nickel-chromium-molybdenum-iron-tungsten alloy.)

A 6 inch (15.24 cm) long, 1 inch (2.54 cm) O.D. section of porous HASTELLOY® C-22® tube, welded to sections of 1 inch (2.54 cm) O.D. dense, non-porous 316L stainless steel tube on each end, was obtained from Mott Metallurgical Corporation. Contaminants were removed by cleaning the tube in an ultrasonic bath with alkaline solution at 60° C. for one half hour. The tube was then sequentially rinsed using tap water, deionized water and isopropanol. The tube was oxidized in static air at 700° C. for 12 hours. The rate of heating and cooling was 3° C. per minute.

A thin layer of $Al_2O_3$ powder was then applied to the outer surface of the support by the following room temperature filtration operation. First, a slurry of the $Al_2O_3$ powder was prepared. One liter of the slurry included 5 g $Al_2O_3$ powder having a particle size of about 1 micron (CAS 1344-28-1, Alfa Aesar, Ward Hill, Mass.) with the balance DI water.

The exterior of the support was exposed to the slurry for 105 seconds while a water aspirator vacuum (absolute pressure of about 23 kPa) was applied to the inside of the support tube. Some of the liquid was thereby drawn through the porous support and a filter cake of $Al_2O_3$ powder formed on the outside of the support. The slurry was continuously stirred as filtration occurred.

The support and resulting filter cake were then immediately activated without drying using the following procedure. The support and filter cake were surface activated by sequentially immersing the exterior of the support in aqueous baths of $SnCl_2$ and $PdCl_2$ while a water aspirator vacuum (absolute pressure of about 23 kPa) was applied to the inside of the support tube. The exterior of the tube was immersed in 500 mL of aqueous $SnCl_2$ (1 g/L) at 20° C. for about 5 minutes and was subsequently rinsed with deionized water. The exterior of the tube was then immersed in 500 mL of aqueous $PdCl_2$ (0.1 g/L) at 20° C. for about 5 minutes followed by rinsing first with 0.01 molar hydrochloric acid and then with deionized water. The above-described surface activation cycle was performed one time. The activated wet filter cake and support were then plated with palladium from the outside, as described in Example 1 using one palladium plating solution for 60 minutes (a total of 1 hour) while a water aspirator vacuum was applied to the inside of the support (absolute pressure range of about 78 to about 84 kPa). The resulting palladium layer remained porous. After the palladium plating, the membrane was dried and it was determined that the thickness of the palladium stabilized $Al_2O_3$ filter cake (impregnated with palladium) was 2 microns. The above steps of $Al_2O_3$ slurry filtration, surface activation and electroless palladium plating were then repeated with several modifications described infra.

First, a new water slurry containing a mixture of $Al_2O_3$ powders with different particle sizes was prepared. A one liter $Al_2O_3$ water slurry was prepared containing 0.81 g $Al_2O_3$ powder with 1 micron particles, 0.2 g $Al_2O_3$ powder with 0.2 micron particles, and 0.12 g $Al_2O_3$ powder with 0.01 to 0.02 micron particles. (All $Al_2O_3$ powders were obtained from Alfa Aesar.) The slurry was applied to the support using the following non-stop procedure with a vacuum (absolute pressure of about 67 kPa) applied to the inside of the support. The support was immersed in the slurry for 5 sec and immediately surface activated one time, as described supra, then again immersed in the slurry for 30 sec and immediately surface activated one time, and finally again immersed in the slurry for 45 sec and immediately surface activated. Then palladium was plated, as described supra, one time for 45 min while a vacuum was applied to the inside of the support (absolute pressure range of about 78 to about 84 kPa). This process resulted in the deposition of an additional 3.8 microns of $Al_2O_3$ filter cake impregnated with palladium.

Then, a porous Pd/Ag/Pd/Ag/Pd layer with a total thickness of 5.75 microns was applied over the support by electroless plating as described in Example 1 but without vacuum (neither surface activation nor palladium plating in this case used vacuum). The resulting membrane was slightly sanded with 2,400 grit sandpaper (Waterproof Silicon Carbide, Struers, Inc.).

The support was surface activated by repeating the surface activation cycle, described supra, three times with an aspirator vacuum (absolute pressure range of about 78 to about 84 kPa) applied to the inside of the support. Palladium was then deposited on the exterior of the tube by electroless plating according to the procedure described in Example 1, with an aspirator vacuum (absolute pressure range of about 78 to about 84 kPa) applied to the inside of the support, three times for 2, 1.5, and 2 hours, respectively, each time for a total of 5.5 hours. Between each of the 1.5 or 2 hour platings, the membrane was rinsed with DI water (at 60° C.) not less than three times. After the last plating and rinsing with DI water, the membrane was dried for 2 hours at 120° C. 5.35 microns of palladium, gravimetrically determined, was applied to the support using this procedure.

The resulting membrane had a hydrogen permeance of 27.6 $(m^3/m^2\text{-h-atm}^{0.5})_{STP}$ at 500° C. This hydrogen permeance was stable for 78 hours. At the end of the hydrogen permeance experiment, the helium leak at 500° C. with a pressure difference of 1 atm was 0.8 sccm. This corresponds to an ideal hydrogen/helium separation factor of 2750.

Example 3

This example describes the fabrication of a composite structure that includes a dense hydrogen-selective membrane, an intermediate layer that includes a tungsten powder and silver powder, and a nominal 0.1 media grade porous HASTELLOY® C-22® support.

A 6 inch (15.24 cm) long, 1 inch (2.54 cm) O.D. section of porous HASTELLOY® C-22® tube, welded to sections of 1 inch (2.54 cm) O.D. dense, non-porous 316L stainless steel tube on each end, was obtained from Mott Metallurgical Corporation. Contaminants were removed by cleaning the tube in an ultrasonic bath with alkaline solution at 60° C. for one half hour. The tube was then sequentially rinsed using tap water, deionized water and isopropanol. The tube was oxidized in static air at 700° C. for 12 hours. The rate of heating and cooling was 3° C. per minute.

A thin layer of tungsten and silver was then applied to the outer surface of the support by the following room temperature filtration operation. First, a slurry of the tungsten and silver was prepared. The one-liter water slurry included: 5 g PEG, average MW 3,400 (Sigma-Aldrich, Cat. No. 20,244-4); 0.98 g tungsten powder, less than 1 micron particles (Alfa Aesar, Stock No. 44210, Lot No. H29M20); 1.48 g tungsten powder, 1 to 5 micron particles (Alfa Aesar, Stock No. 10400, Lot No. E03M02); and 1.7 g silver powder, 0.6 to 2 micron particles (Alfa Aesar, Stock No. 41298, Lot No. F27K20).

The exterior of the support was exposed to the slurry for 15 sec while a water aspirator vacuum (absolute pressure of about 67 kPa) was applied to the inside of the support tube. Some of the liquid was thereby drawn through the porous support and a filter cake of tungsten and silver powder formed on the outside of the support. The slurry was continuously stirred as filtration occurred.

The support and resulting filter cake were then immediately surface activated without drying one time, as described in Example 2, with a vacuum (absolute pressure of about 67 kPa) applied to the inside of the support.

The surface activated support (without drying) was again immersed in the same slurry for 30 sec and immediately surface activated one time and then again immersed in the slurry for 45 sec and immediately surface activated one time. All these steps were applied as a non-stop procedure with a vacuum (absolute pressure of about 67 kPa) applied to the inside of the support and without intermediate drying steps. During these operations, a portion of the silver powder was observed to float on the surface of the slurry. During application of the slurry, the support was moved up and down continuously to insure uniform contact of the support surface with the floating silver powder. This process resulted in the deposition of a tungsten powder filter cake with traces of silver powder.

The wet support was palladium plated one time (using one plating solution) for 30 min with a vacuum (absolute pressure range of about 78 to about 84 kPa) applied to the inside of the support. Without wishing to be held to any particular theory, the electroless plating of palladium using vacuum is thought to have resulted in the deposition of palladium in the voids within the filter cake. Therefore, this filter cake is thought to have been stabilized by the electroless deposition of palladium, which is thought to have bound at least some of the adjacent powder particles together. The total thickness of the filter cake and plated palladium at this stage was 3.5 microns. (It was estimated that 3.5 microns contained about 2.5 microns of tungsten/silver and about 1 micron of palladium impregnated therein).

Then, using the method described in Example 2, a porous Pd/Ag/Pd/Ag/Pd layer with a total thickness of 3.5 microns was applied over the support by electroless plating without vacuum and with plating times of about half (45 min palladium plating; 45 min silver plating; 45 min palladium plating; 45 min silver plating; 45 min palladium plating (both activation and plating were performed without vacuum). After the plating and rinsing with DI water, the membrane was dried for 2 hours at 120° C. Then, the support was slightly sanded with 2,400 grit sandpaper (Waterproof Silicon Carbide, Struers, Inc.).

The support was surface activated by repeating the surface activation cycle, described in Example 2, three times with a vacuum (absolute pressure range of about 78 to about 84 kPa) applied to the inside of the support. Palladium was then deposited on the exterior of the tube by electroless plating according to the procedure described in Example 1 three times for 90, 90, and 60 minutes each time, respectively, for a total of 4 hours. Between each of the 60 or 90 minute platings, the membrane was rinsed with DI water (at 60° C.) not less than three times. After the last plating and rinsing with DI water, the membrane was dried for 2 hours at 120° C. 6.0 microns of palladium, gravimetrically determined, was applied to the support. The support was again surface activated twice with a vacuum (absolute pressure range of about 78 to about 84 kPa) applied to the inside of the support and then palladium was plated under the same vacuum three times for 50 min, 100 min, and 60 min, respectively. After the last plating and rinsing with DI water, the membrane was dried for 2 hours at 120° C. The resulting membrane contained 10.2 microns of palladium (gravimetrically determined).

The membrane was activated three times without vacuum and plated with palladium for one hour without vacuum and the thickness of the membrane became 11.2 microns. The wet membrane was finished by immediately electroplating a 0.6 micron layer of gold over the support followed by electroless plating of a 1.3 micron palladium layer without any surface activation.

The resulting membrane had a final hydrogen permeance of 41.7 $(m^3/m^2\text{-}h\text{-}atm^{0.5})_{STP}$ at 500° C. after 250 hours.

Example 4

This example describes the fabrication of a composite structure that includes a dense hydrogen-selective membrane, an intermediate layer that includes a tungsten powder and silver powder, and a nominal 0.1 media grade porous HASTELLOY® C-22® support.

A 6 inch (15.24 cm) long, 1 inch (2.54 cm) O.D. section of porous HASTELLOY® C-22® tube, welded to sections of 1 inch (2.54 cm) O.D. dense, non-porous 316L stainless steel tube on each end, was obtained from Mott Metallurgical Corporation. Contaminants were removed by cleaning the tube in an ultrasonic bath with alkaline solution at 60° C. for one half hour. The tube was then sequentially rinsed using tap water, deionized water and isopropanol. The tube was oxidized in static air at 700° C. for 12 hours. The rate of heating and cooling was 3° C. per minute.

A filter cake of tungsten and silver was then applied to the outer surface of the support tube by the following room temperature filtration operation. First, a slurry of the tungsten and silver was prepared. The one-liter water slurry included: 5 g PEG, average MW 3,400 (Sigma-Aldrich, Cat. No. 20,244-4); 4.6 g/L tungsten powder, less than 1 micron particles (Alfa Aesar, Stock No. 44210, Lot No. H29M20); and 0.4 g/L silver powder, 0.6 to 2.0 micron particles (Alfa Aesar, Stock No. 41298, Lot No. F27K20). The dry ingredients were added to water and stirred overnight to form the slurry.

The dry clean support was wetted with DI water by immersing the outside of the support in the water while pulling a light vacuum on the inside. Then, the exterior of the wetted support was exposed to the slurry for about 3 minutes while a water aspirator vacuum (absolute pressure range of about 34 to about 51 kPa) was applied to the inside of the support tube. The support was raised and lowered in and out of the slurry repeatedly during exposure to the slurry and with the vacuum continuously applied to the inside of the support. Some of the liquid was drawn through the porous support and a filter cake of tungsten and silver powder formed on the outside of the support. The slurry was continuously stirred as filtration occurred. After 3 minutes of exposure to the slurry, the support was exposed to DI water for about 5 minutes while the vacuum continued to be applied to the inside of the support tube.

The support and resulting filter cake were then immediately surface activated without drying one time, as described in Example 2, with a vacuum (absolute pressure range of about 34 to about 51 kPa) applied to the inside of the support. Following surface activation, the support and filter cake were dried in room temperature air with the vacuum applied to the inside of the support for 2 minutes. The surface activated support and filter cake were then dried overnight at 120° C. with no vacuum applied. At this point, the thickness of the dry filter cake was estimated to be about 3.5 microns (gravimetrically determined).

Then, a porous Pd/Ag/Pd/Ag/Pd layer with a total thickness of about 12 microns was applied over the support by electroless plating (with no intermediate drying steps) as described in Example 1 while a vacuum (absolute pressure range of about 78 to about 84 kPa) was applied to the inside of the support tube. The plating solutions were at atmospheric pressure. The metallic layers were applied by contacting the support with a plating solution for 1.5 hours (palladium), 45 min. (silver), 45 min. (palladium), 45 min. (silver), and then 45 min. (palladium). Following the final layer of palladium, the support was dried overnight at 120° C.

The surface of the Pd/Ag/Pd/Ag/Pd layer was lightly brushed, reducing the thickness of the layer to about 10.8 microns. The exterior of the support was then surface activated once, as described supra, while applying a vacuum (absolute pressure of about 67 kPa) to the inside of the support. Then, the exterior of the support was immediately plated with palladium according to the electroless plating procedure described in Example 1 two times for 2 hours each time while a vacuum (absolute pressure range of about 78 to about 84 kPa) was applied to the inside of the support tube for a total of 4 hours. Between each of the 2 hour platings, the membrane was rinsed with DI water (at 60° C.) not less than three times. There was no intermediate surface activation or drying of these palladium layers between the two platings. After the last plating and rinsing with DI water, the membrane was dried for 2 hours at 120° C. 4.3 microns of palladium, gravimetrically determined, had been applied to the support.

The support and resulting filter cake were then immediately surface activated without drying 3 times, as described in Example 1 with no vacuum applied to the inside of the support. Then, the exterior of the support was plated with palladium three times for 1.5 hours each time (with no vacuum applied to the inside of the support tube) for a total of 4.5 hours. Between each of the 1.5 hour platings, the membrane was rinsed with DI water (at 60° C.) not less than three times. There was no intermediate surface activation or drying of these palladium layers between the three platings.

After the last plating and rinsing with DI water, the membrane was dried overnight at 120° C. After drying, it was gravimetrically determined that about 5.9 microns of additional palladium had been applied for a total thickness of 10.2 microns of palladium on top of the Pd/Ag/Pd/Ag/Pd layer.

The support and resulting filter cake were then again surface activated without drying 3 times, as described in Example 1 with no vacuum applied to the inside of the support. Then, the exterior of the support was plated with palladium three times for 1.5 hours each time (with no vacuum applied to the inside of the support tube) for a total of 4.5 hours. Between each of the 1.5 hour platings, the membrane was rinsed with DI water (at 60° C.) not less than three times. There was no intermediate surface activation drying of these palladium layers between the three platings. After the last plating and rinsing with DI water, the membrane was dried overnight at 120° C. After drying, it was gravimetrically determined that about 4.7 microns of additional palladium had been applied for a total thickness of 14.9 microns of palladium on top of the Pd/Ag/Pd/Ag/Pd layer.

The surface of the membrane was then lightly sanded using 2400 grit sandpaper. The thickness of the palladium layer covering the Pd/Ag/Pd/Ag/Pd layer was then gravimetrically determined to be 11.7 microns.

The support and resulting filter cake were then again surface activated without drying 3 times, as described in Example 1 with no vacuum applied to the inside of the support tube. Then, the exterior of the support was plated with palladium three times for 1.5, 1.5 and 1 hour, respectively, each time (with a vacuum (absolute pressure range of about 78 to about 84 kPa) applied to the inside of the support) for a total of 4 hours. Between each of the 1.5 or 1 hour platings, the membrane was rinsed with DI water (at 60° C.) not less than three times. There was no intermediate surface activation or drying of these palladium layers between the three platings. After the last plating and rinsing with DI water, the membrane was dried overnight at 120° C.

The support and resulting filter cake were once again surface activated without drying 3 times, as described in Example 1 with no vacuum applied to the inside of the support tube. Then, the exterior of the support was plated with palladium three times for 1.5, 2 and 1.5 hours, respectively, each time (with a vacuum (absolute pressure range of about 78 to about 84 kPa) applied to the inside of the support) for a total of 5 hours. Between each of the 1.5 or 2 hour platings, the membrane was rinsed with DI water (at 60° C.) not less than three times. There was no intermediate surface activation or drying of these palladium layers between the three platings. After the last plating and rinsing with DI water, the membrane was dried overnight at 120° C. It was gravimetrically determined that a total thickness of 21.3 microns of palladium had been applied top of the Pd/Ag/Pd/Ag/Pd layer.

The resulting membrane had a hydrogen permeance of 21.8 $[m^3/m^2\text{-hr-atm}^{0.5}]_{STP}$ after 96 hours of testing at 500° C.

While this invention has been particularly shown and described with references to preferred embodiments thereof, it will be understood by those skilled in the art that various changes in form and details may be made therein without departing from the scope of the invention encompassed by the appended claims.

We claim:
1. A composite gas separation module, comprising:
a) a porous metal substrate;
b) an intermediate layer that includes a metal powder having a Tamman temperature higher than the Tamman temperature of the porous metal substrate and wherein the intermediate layer overlies the porous metal substrate; and
c) a dense hydrogen-selective membrane, wherein the dense hydrogen-selective membrane overlies the intermediate layer.

2. The composite gas separation module of claim 1 wherein the porous metal substrate is stainless steel.

3. The composite gas separation module of claim 1 wherein the porous metal substrate is an alloy containing chromium and nickel.

4. The composite gas separation module of claim 3 wherein the alloy further contains molybdenum.

5. The composite gas separation module of claim 1 further comprising a layer of a ceramic bonded to the porous metal substrate and underlying the intermediate layer.

6. The composite gas separation module of claim 1 wherein the metal powder has an average particle size ranging from about 0.5 to about 5 microns.

7. The composite gas separation module of claim 1 wherein the metal powder has a Tamman temperature higher than the Tamman temperature of the dense hydrogen-selective membrane.

8. The composite gas separation module of claim 1 wherein the intermediate layer further includes a powder selected from the group consisting of metal oxide powders, ceramic powders, zeolite powders, and combinations thereof.

9. The composite gas separation module of claim 1 wherein the metal powder includes a material selected from the group consisting of tungsten, silver, and combinations thereof.

10. The composite gas separation module of claim 1 wherein the intermediate layer further includes at least one material having a Tamman temperature less than or about equal to the Tamman temperature of the dense hydrogen-selective membrane.

11. The composite gas separation module of claim 10 wherein the intermediate layer further includes at least one material selected from the group consisting of silver, gold, copper, cerium and yttrium.

12. The composite gas separation module of claim 1 wherein the intermediate layer has an average thickness of at least about 1 micron.

13. The composite gas separation module of claim 12 wherein the intermediate layer has an average thickness ranging from about 1 to about 10 microns.

14. The composite gas separation module of claim 13 wherein the intermediate layer has an average thickness ranging from about 1 to about 5 microns.

15. The composite gas separation module of claim 1 wherein the average pore size of the intermediate layer is less than the average pore size of the porous metal substrate.

16. The composite gas separation module of claim 1 wherein the intermediate layer has a top side and a bottom side and wherein the intermediate layer is directly adjacent to the porous metal substrate on the bottom side and is directly adjacent to the dense hydrogen-selective membrane on the top side.

17. The composite gas separation module of claim 1 wherein the dense hydrogen-selective membrane includes palladium or an alloy thereof.

18. A method for fabricating a composite gas separation module, comprising the steps of:
   a) applying an intermediate layer over a porous metal substrate, the intermediate layer including a metal powder having a Tamman temperature higher than the Tamman temperature of the porous metal substrate; and
   b) applying a dense hydrogen-selective membrane over the intermediate layer, the intermediate layer including the metal powder, thereby forming the composite gas separation module.

19. The method of claim 18 further comprising the step of oxidizing the surface of the porous metal substrate prior to applying the intermediate layer.

20. The method of claim 18 wherein the intermediate layer is applied by depositing the metal powder from a slurry.

21. The method of claim 20 wherein the slurry is a water-based slurry.

22. The method of claim 18 wherein the metal powder has an average particle size ranging from about 0.5 to about 5 microns.

23. The method of claim 18 wherein the intermediate layer further includes a powder selected from the group consisting of metal oxide powders, ceramic powders, zeolite powders, and combinations thereof.

24. The method of claim 18 wherein the metal powder includes a material selected from the group consisting of tungsten, silver, and combinations thereof.

25. The method of claim 18 wherein the intermediate layer has an average thickness of least about 1 to about 10 microns.

26. The method of claim 18 wherein the average pore size of the intermediate layer is less than the average pore size of the porous metal substrate.

27. The method of claim 18 further comprising the step of surface activating the intermediate layer prior to applying the dense hydrogen-selective layer.

28. The method of claim 27 wherein surface activating the intermediate layer includes seeding the intermediate layer with nuclei of a hydrogen-selective metal.

29. The method of claim 18 wherein applying the dense hydrogen-selective membrane includes applying palladium, or an alloy thereof, over the intermediate layer.

30. The method of claim 18 wherein the dense hydrogen-selective membrane includes palladium alloyed with at least one of the metals selected from the group consisting of copper, silver, gold, platinum, ruthenium, rhodium, yttrium, cerium and indium.

31. The method of claim 18 wherein applying the dense hydrogen-selective membrane includes depositing a hydrogen-selective metal over the intermediate layer by a method selected from the group consisting of electroless plating, electroplating, thermal deposition, chemical vapor deposition, spray deposition, sputter coating, e-beam evaporation, ion beam evaporation and spray pyrolysis.

32. A composite gas separation module fabricated by the method of claim 18.

33. A method for selectively separating hydrogen gas from a hydrogen gas-containing gaseous stream, comprising the step of:
   directing the hydrogen gas-containing gaseous stream to a composite gas separation module, wherein the composite gas separation module includes:
      a) a porous metal substrate;
      b) an intermediate layer that includes a metal powder having a Tamman temperature higher than the Tamman temperature of the porous metal substrate and wherein the intermediate layer overlies the porous metal substrate; and
      c) a dense hydrogen-selective membrane, wherein the dense hydrogen-selective membrane overlies the intermediate layer;
   whereby hydrogen gas is at least partially partitioned from the gaseous stream by passing through the dense hydrogen-selective membrane.

34. The method of claim 33 further comprising the step of reacting hydrogen gas-producing reactants to produce the gaseous stream.

35. The method of claim 33 wherein the metal powder has an average particle size ranging from about 0.5 to about 5 microns.

36. The method of claim 33 wherein the intermediate layer further includes a powder selected from the group consisting of metal oxide powders, ceramic powders, zeolite powders, and combinations thereof.

37. The method of claim 33 wherein the metal powder includes a material selected from the group consisting of tungsten, silver, and combinations thereof.

38. The method of claim 33 wherein the intermediate layer has an average thickness ranging from about 1 to about 10 microns.

39. The method of claim 33 wherein the dense hydrogen-selective membrane includes palladium or an alloy thereof.

40. A composite gas separation module, comprising:
   a) a porous metal substrate;
   b) an intermediate unsintered metal powder layer; and
   c) a dense gas-selective membrane, wherein the dense gas-selective membrane overlies the intermediate unsintered metal powder layer.

41. The composite gas separation module of claim 40 wherein the intermediate unsintered metal powder layer includes an unsintered metal powder having a Tamman temperature of at least the Tamman temperature of the porous metal substrate.

42. The composite gas separation module of claim 40 wherein the intermediate unsintered metal powder layer includes an unsintered metal powder having an average particle size ranging from about 0.5 to about 5 microns.

43. A composite gas separation module, comprising:
   a) a porous metal substrate;
   b) an intermediate layer that includes: (1) a powder having a Tamman temperature higher than the Tamman temperature of the porous metal substrate and wherein the intermediate layer overlies the porous metal substrate, and (2) at least one material having a Tamman temperature less than or about equal to the Tamman temperature of a dense hydrogen-selective membrane selected from the group consisting of silver, gold, copper, cerium and yttrium; and
   c) the dense hydrogen-selective membrane, wherein the dense hydrogen-selective membrane overlies the intermediate layer.

* * * * *